United States Patent
Lau et al.

(10) Patent No.: US 7,516,257 B2
(45) Date of Patent: Apr. 7, 2009

(54) MECHANISM TO HANDLE UNCORRECTABLE WRITE DATA ERRORS

(75) Inventors: Victor Lau, Marlboro, MA (US); Pak-lung Seto, Shrewsbury, MA (US); Nai-Chih Chang, Shrewsbury, MA (US)

(73) Assignee: Intel Corporation, Santa Clara, CA (US)

( * ) Notice: Subject to any disclaimer, the term of this patent is extended or adjusted under 35 U.S.C. 154(b) by 79 days.

(21) Appl. No.: 11/237,454

(22) Filed: Sep. 27, 2005

(65) Prior Publication Data

US 2007/0073947 A1    Mar. 29, 2007

(51) Int. Cl.
 *G06F 13/42* (2006.01)
 *G08C 25/02* (2006.01)
(52) U.S. Cl. ...................... 710/110; 714/748
(58) Field of Classification Search .................. 710/19, 710/36, 105, 107, 110; 711/11; 714/748
 See application file for complete search history.

(56) References Cited

U.S. PATENT DOCUMENTS

| | | | |
|---|---|---|---|
| 6,108,713 A | | 8/2000 | Sambamurthy et al. |
| 6,148,421 A | * | 11/2000 | Hoese et al. .................. 714/50 |
| 6,782,465 B1 | | 8/2004 | Circenis |
| 7,032,040 B2 | * | 4/2006 | Hosoya ........................ 710/19 |
| 7,047,533 B2 | | 5/2006 | Circenis |
| 7,120,846 B2 | * | 10/2006 | Kawagishi et al. ........... 714/748 |
| 7,165,127 B2 | * | 1/2007 | Monteiro et al. .............. 710/29 |
| 7,225,278 B1 | | 5/2007 | Baxter et al. |
| 7,319,698 B2 | * | 1/2008 | Higashigawa et al. ....... 370/394 |
| 7,441,154 B2 | * | 10/2008 | Klotz et al. .................... 714/39 |
| 2004/0019835 A1 | | 1/2004 | Marisetty et al. |
| 2005/0034045 A1 | | 2/2005 | Lueck et al. |
| 2005/0076164 A1 | | 4/2005 | Malalur |
| 2005/0120166 A1 | * | 6/2005 | Evans et al. .................. 711/111 |
| 2005/0135421 A1 | | 6/2005 | Chang et al. |
| 2005/0154946 A1 | | 7/2005 | Mitbander et al. |
| 2005/0268136 A1 | | 12/2005 | Kostadinov et al. |
| 2006/0101171 A1 | * | 5/2006 | Grieff et al. ................... 710/36 |
| 2007/0002827 A1 | | 1/2007 | Lau et al. |

(Continued)

FOREIGN PATENT DOCUMENTS

JP        08-179999        * 12/1996

(Continued)

OTHER PUBLICATIONS

Hallack-STampler, "Definition of Managed Objects for SCSI Entities" IETF Standard-working-draft, Internet Engineering Taks Force IETF, CH, vol. ips, No. 7, Jul. p. 5, line 4-9, line 6; figures 1-3.

(Continued)

*Primary Examiner*—Glenn A Auve
*Assistant Examiner*—Trisha Vu
(74) *Attorney, Agent, or Firm*—Christopher K. Gagne

(57) ABSTRACT

According to one embodiment, a system is disclosed. The system includes an initiator device to transmit input/output (I/O) write data and a target device, coupled to the initiator device, to receive the write data from the initiator device as a first segment of data and a second segment of data. The target device re-transmits a transfer ready frame to force the initiator device to retransmit the second segment in response to detecting an uncorrectable error in the second segment.

18 Claims, 4 Drawing Sheets

U.S. PATENT DOCUMENTS

| | | |
|---|---|---|
| 2007/0011333 A1 | 1/2007 | Lau et al. |
| 2007/0011548 A1 | 1/2007 | Chemudupati et al. |
| 2007/0073921 A1 | 3/2007 | Vemula et al. |
| 2007/0074062 A1 | 3/2007 | Chang et al. |

OTHER PUBLICATIONS

Krueger, "T1 Network Address Authority (NAA) Naming Format for iSCSI Node Names" IETF Standard, Internet Engineering Task Force, IETF, CH, Feb. 2005, p. 4, line 19-p. 5, line 6.

Maxtor Corporation: "SAS-1.1, ST_T (transport layer for SSP target ports) state machines" Jul. 12, 2004, T10 Technical Committee, XP002407724, Retrieved from the Internet: URL: http://www.t10.org/ftp/t10/document.04/04-137r2.pdf, paragraph [9.2.6.3.3.5.1].

"Non-Final Office Action of U.S. Appl. No. 11/237,448 Mailed on Feb. 4, 2008, 10 Pages."

"Response to Non-Final Office Action for U.S. Appl. No. 11/237,448 filed on Apr. 4, 2008, 14 Pages."

"Non-Final Office Action for U.S. Appl. No. 11/165,725 Mailed on Mar. 17, 2008, 10 Pages."

"Non-Final Office Action for U.S. Appl. No. 11/237,455 Mailed on Oct. 18, 2007, 12 Pages."

"Response to Non-Final Office Action for U.S. Appl. No. 11/237,455 filed on Nov. 7, 2007, 12 Pages."

"Final Office Action for U.S. Appl. No. 11/237,455 Mailed on Jan. 22, 2008, 13 Pages."

"Response to Final Office Action for U.S. Appl. No. 11/237,455 filed on Mar. 11, 2008, 15 Pages."

\* cited by examiner

MECHANISM TO HANDLE UNCORRECTABLE WRITE DATA ERRORS

FIELD OF THE INVENTION

The present invention relates to computer systems; more particularly, the present invention relates to computer system interaction with storage devices.

BACKGROUND

Serial attached storage protocols, such as serial ATA (SATA) and serial Small Computer System Interface (SCSI) (SAS) are becoming more prevalent for connecting storage devices to a computer system. In computer systems implementing such serial storage devices, one storage device in the system may communicate with others. For example, a device requesting data (referred to as the initiator device) may receive data from a target device.

Typically, communication between the devices may occur after an identification sequence and the establishing of connections between the devices. In a typical SAS serial SCSI (SSP) target controller when write data is transferred from a receive buffer to the target device and data corruption detected (uncorrectable memory error etc), the target device will send a bad response frame to the initiator device. Upon receiving the bad response frame, the initiator device retries to transmit the entire I/O write command. For large I/O transactions (e.g., 2 GB-4 GB), having to re-transmit the entire data write command is time consuming and impracticable.

SUMMARY

According to one embodiment a system is disclosed. The system includes an initiator device to transmit input/output (I/O) write data and a target device, coupled to the initiator device, to receive the write data from the initiator device as a first segment of data and a second segment of data. The target device re-transmits a transfer ready frame to force the initiator device to retransmit the second segment in response to detecting an uncorrectable error in the second segment.

BRIEF DESCRIPTION OF THE DRAWINGS

The invention is illustrated by way of example and not limitation in the figures of the accompanying drawings, in which like references indicate similar elements, and in which.

DETAILED DESCRIPTION

A mechanism for handling uncorrectable write data errors is described. In the following detailed description of the present invention numerous specific details are set forth in order to provide a thorough understanding of the present invention. However, it will be apparent to one skilled in the art that the present invention may be practiced without these specific details. In other instances, well-known structures and devices are shown in block diagram form, rather than in detail, in order to avoid obscuring the present invention.

Reference in the specification to "one embodiment" or "an embodiment" means that a particular feature, structure, or characteristic described in connection with the embodiment is included in at least one embodiment of the invention. The appearances of the phrase "in one embodiment" in various places in the specification are not necessarily all referring to the same embodiment.

Figure 1:
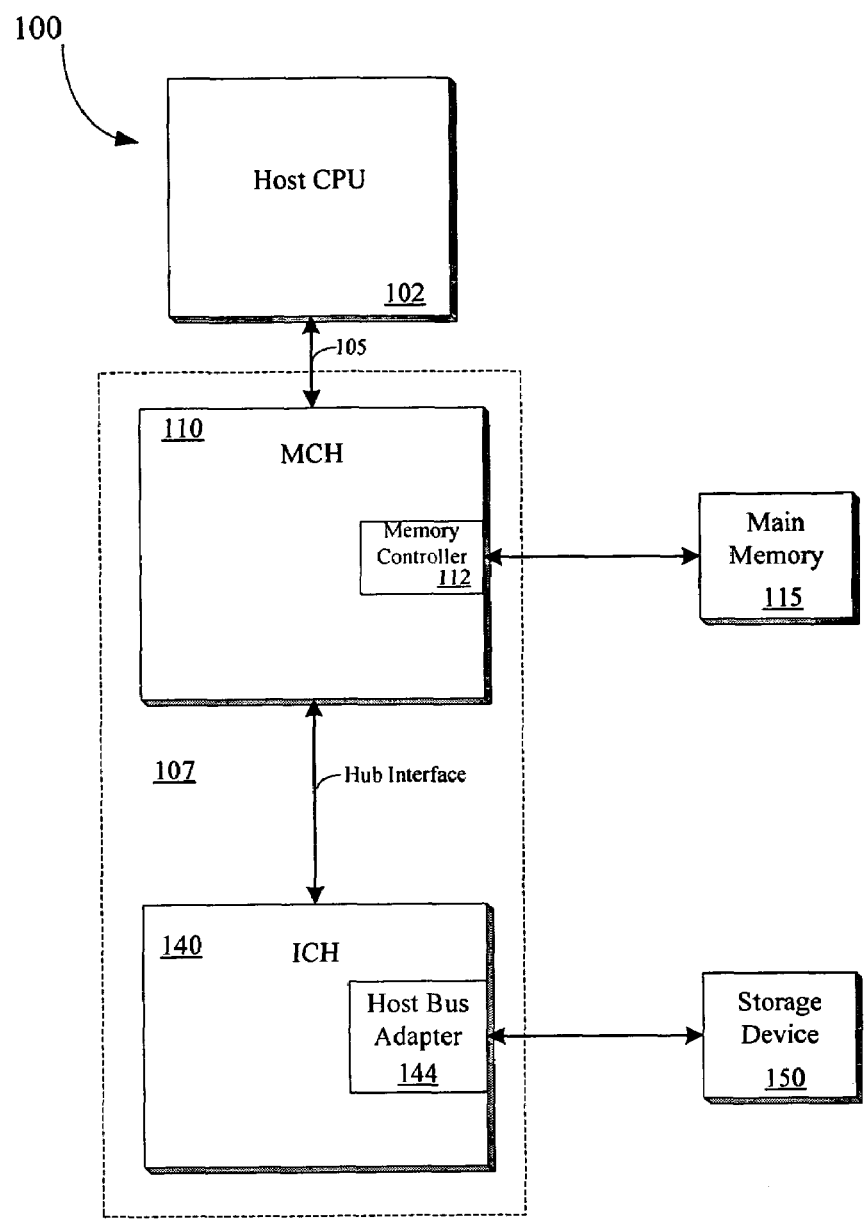
FIG. 1 is a block diagram of one embodiment of a computer system.

FIG. 1 is a block diagram of one embodiment of a computer system 100. Computer system 100 includes a central processing unit (CPU) 102 coupled to an interface 105. In one embodiment, CPU 102 is a processor in the Pentium® family of processors Pentium® IV processors available from Intel Corporation of Santa Clara, Calif. Alternatively, other CPUs may be used. For instance, CPU 102 may be implemented using multiple processing cores. In other embodiments, computer system 100 may include multiple CPUs 102

In a further embodiment, a chipset 107 is also coupled to interface 105. Chipset 107 includes a memory control hub (MCH) 110. MCH 110 may include a memory controller 112 that is coupled to a main system memory 115. Main system memory 115 stores data and sequences of instructions that are executed by CPU 102 or any other device included in system 100. In one embodiment, main system memory 115 includes dynamic random access memory (DRAM); however, main system memory 115 may be implemented using other memory types. Additional devices may also be coupled to interface 105, such as multiple CPUs and/or multiple system memories.

MCH 110 is coupled to an input/output control hub (ICH) 140 via a hub interface. ICH 140 provides an interface to input/output (I/O) devices within computer system 100. ICH 140 may support standard I/O operations on I/O busses such as peripheral component interconnect (PCI), accelerated graphics port (AGP), universal serial bus (USB), low pin count (LPC) bus, or any other kind of I/O bus (not shown).

According to one embodiment, ICH 140 includes a host bus adapter (HBA) 144. HBA 144 serves as a controller implemented to control access to one or more hard storage devices 150. In such an embodiment, HBA 144 operates as a serial attached SCSI (SAS) device coupled to one or more additional SAS devices. In a further embodiment, hard disk drive 150 is a serial SCSI (SSP) drive. However in other embodiments, storage device 150 may be implemented using other serial protocols.

As discussed above communication may occur between SAS devices upon establishing a connection between an initiator device such as HBA 144 and target device such as hard drive 150. As previously discussed, HBA 144 as the initiator device may be coupled to multiple serial drive devices via different ports.

Figure 2:
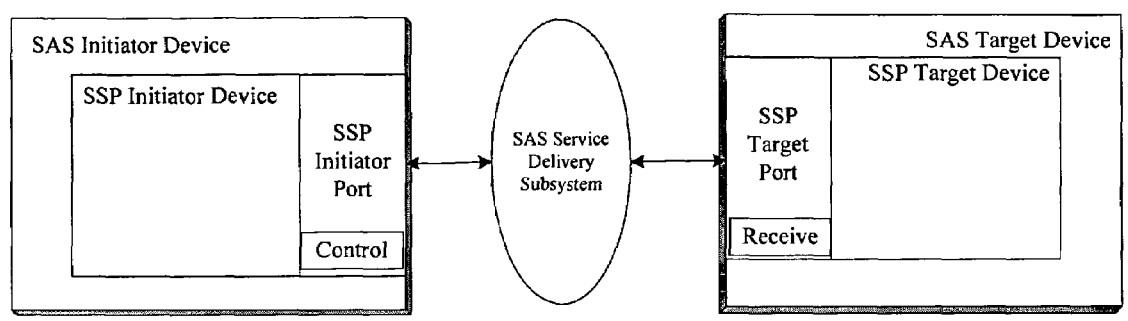
FIG. 2 illustrates one embodiment of an SAS Serial SCSI Protocol (SSP) architecture model.

FIG. 2 illustrates one embodiment of a SAS SSP architecture. Both the SAS initiator and target devices include SSP devices. Further, the SSP initiator device includes an initiator port (or controller), while the SSP target device includes a target controller. The initiator and target ports are coupled via a SAS service delivery subsystem. The SAS service delivery subsystem may include cables, backplanes and expander devices.

Whenever write data is to be transferred between an initiator device and a target device an uncorrectable data error may occur. Specifically, when data is to be transferred from a receive buffer at the SSP target controller to the SAS target device and data corruption detected, the target controller will send a bad response frame to the initiator device.

Figure 3:
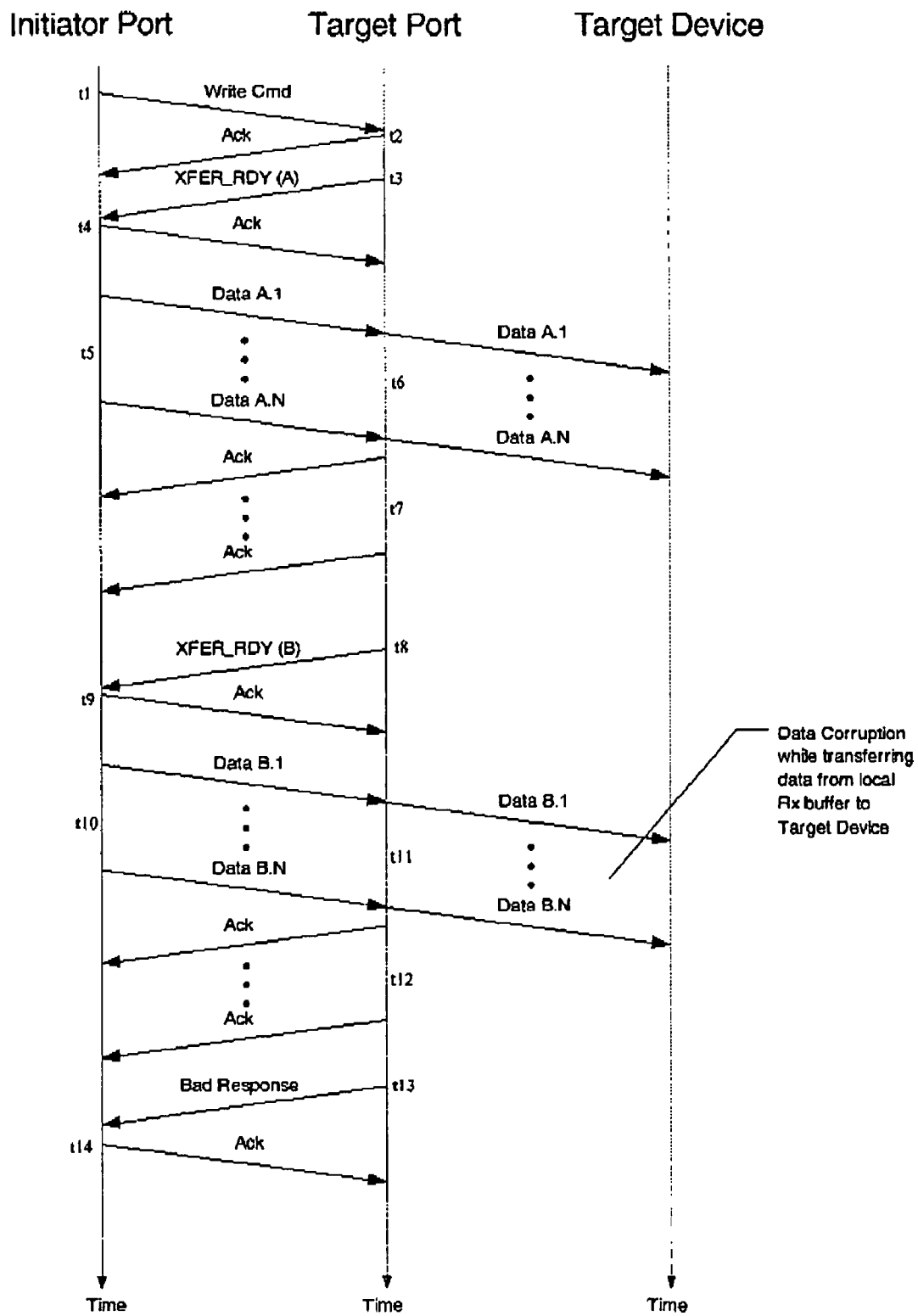
FIG. 3 illustrates a sequence diagram for handling uncorrectable write data error by transmitting a bad response frame.

FIG. 3 illustrates a sequence diagram for handling an uncorrectable write data error in conventional SAS SSP transactions, where a bad response frame is transmitted. At time t1 a write command is transmitted from the initiator port to the target port, followed by an acknowledgment frame (Ack) forwarded back to the initiator port from the target port at time t2.

In many instances the write command may indicate that the amount of data to be transferred to the target device from the initiator device (e.g., 3 MB) may be greater than the data size that can be handled by the target device at one time (e.g., 1.5 MB). Thus, the write data is to be transferred in two or more segments. Consequently, at time t3, the initiator port receives a transfer ready (XFER_RDY (A)) signal indicating that the target port is ready to receive a first segment of data from the initiator port. Following an Ack to the target port at time t4, the initiator transfers the first segment of data at time t5. At time t6, the data is forwarded from the target port to the SAS target device, followed by Acks from the target port to the initiator port at time t7.

At time t8, the initiator port receives another transfer ready (XFER_RDY (B)) signal indicating that the target port is ready to receive the second segment of data from the initiator port. Following an Ack at time t9, the initiator transfers the second segment of data at time t10. At time t11, the data is forwarded from the target port to the SAS target device.

However, this time data corruption is detected while the data is transferred from the target port to the target device. After Acks transmitted from the target port to the initiator port at time t12, a Bad Response frame is transmitted to the initiator port from the target port at time t13 indicating an uncorrectable error is detected.

Following an Ack at t14, a FW error handling routine is executed. In response, the initiator port typically proceeds to execute the entire write command from the beginning of the sequence at t1. Thus, both the first segment and second segment of data is to be transferred although an error occurred only in the transfer of the second segment. As discussed above, having to re-transmit the entire data write command is very time consuming.

According to one embodiment, a transport layer retry mechanism is implemented to eliminate the FW process of having to retransmit an entire write command when an error occurred at a data segment after previous segments have been successfully transferred. In such an embodiment, both the initiator port and the target port are configured to support transport layer retry. Further, the initiator port includes a control module to facilitate the transport layer retry mechanism. In one embodiment, the control module includes control bits that are used to enable transport layer retry if a data transmission error occurs.

Figure 4:
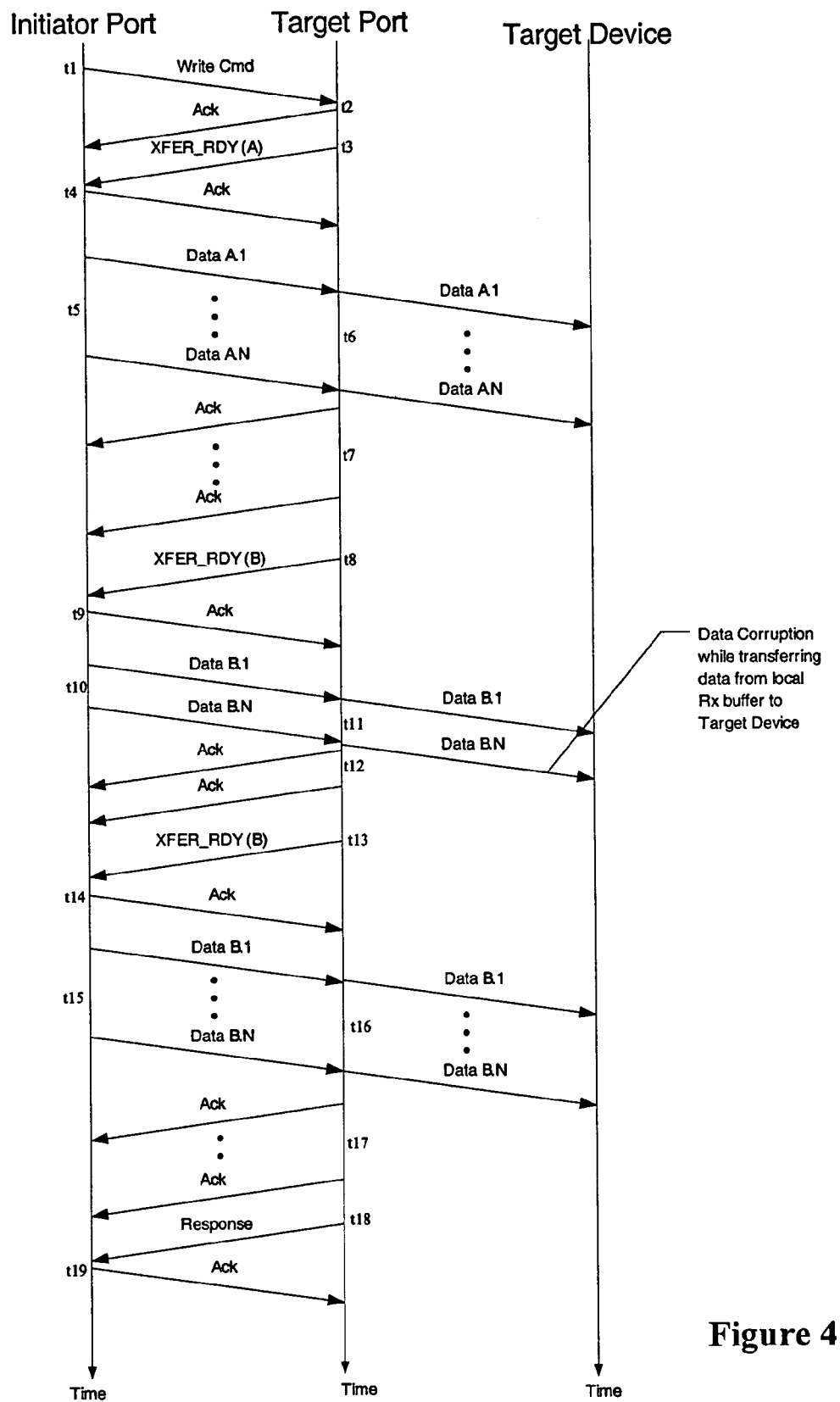
FIG. 4 illustrates a sequence diagram for one embodiment of handling uncorrectable write data error.

FIG. 4 illustrates a sequence diagram for one embodiment of handling uncorrectable write data error register using the transport layer retry mechanism. As shown in FIG. 4, the I/O write process operates the same as described in FIG. 3 for times t1 to t12, where the data corruption is detected. However, rather than transmitting the Bad Response frame, the target port retransmits the XFER_RDY (B) signal at time t13. Receiving the XFER_RDY (B) signal causes the initiator port to perform the transport layer retry to retransmit data for XFER_RDY (B), although the target port has received the Ack for the previous XFER_RDY (B) signal.

Subsequently, the initiator port retransmits all of the write data for XFER_RDY (B). From times t14-t19, the process for transmitting the second segment of data from the initiator port to the target port and the target device is implemented. Therefore, the time of having to resend the first segment of data has been saved.

Whereas many alterations and modifications of the present invention will no doubt become apparent to a person of ordinary skill in the art after having read the foregoing description, it is to be understood that any particular embodiment shown and described by way of illustration is in no way intended to be considered limiting. Therefore, references to details of various embodiments are not intended to limit the scope of the claims, which in themselves recite only those features regarded as essential to the invention.

What is claimed is:

1. A system comprising:
   an initiator device to transmit input/output (I/O) write data; and
   a target device, coupled to the initiator device, to receive the write data from the initiator device as a first segment of data and a second segment of data, the target device to transmit to the initiator device a first transfer ready frame and an initially transmitted second transfer ready frame to request transmission to the target device of the first segment and the second segment, respectively, the target device to transmit another second transfer ready frame to the initiator device to force the initiator device to retransmit the second segment in response to detecting an uncorrectable error in the second segment,
   wherein the initiator device retransmits the second segment of write data to the target device in response to receiving the another second transfer ready frame and prior to transmitting a third segment of write data, the another second transfer ready frame being a retransmitted copy of the initially transmitted second transfer ready frame and also being a XFER RDY frame as defined in a serial attached small computer system interface protocol.

2. The system of claim 1 wherein the initiator device comprises an initiator serial SCSI (SSP) port to transmit the write data and the target device comprises a target SSP port to receive the write data.

3. The system of claim 2 wherein the initiator SSP port and the target SSP port each support transport layer retry.

4. The system of claim 3 wherein the initiator SSP port comprises a control module to facilitate transport layer retry in response to receiving the another second transfer ready frame from the target port.

5. The system of claim 4 wherein the control module includes one or more control bits to activate transport layer retry in response to receiving the another second transfer ready frame from the target port.

6. The system of claim 2 further comprising a service delivery subsystem coupled between the initiator SSP port and the target SSP port.

7. The system of claim 1 wherein the initiator device is a host bus adapter (HBA) and the target device is a disk drive.

8. The system of claim 1 wherein the initiator device is a host bus adapter (HBA) and the target device is a tape drive.

9. A host bus adapter (HBA) comprising a serial SCSI (SSP) port to operate as an initiator SSP port to transmit input/output (I/O) write data to a target device in a first segment of data and a second segment of data in response to receipt from the target device of a first transfer ready frame and an initially transmitted second transfer ready frame respectively, to receive another second transfer ready frame from the target device indicating that an uncorrectable error has been detected in the second segment and to perform a transport layer retry in response to receiving the another second transfer ready frame from the target device prior to transmitting a third segment of write data, the another second transfer ready frame being a retransmitted copy of the initially transmitted second transfer ready frame and also being a XFER RDY frame in accordance with a serial attached small computer system interface protocol.

10. The HBA of claim 9 wherein the HBA retransmits the second segment of write data to the target device.

11. The HBA of claim 10 wherein the initiator SSP port supports transport layer retry.

12. The HBA of claim 11 wherein the initiator SSP port comprises a control module to facilitate transport layer retry in response to receiving the another second transfer ready frame from the target port.

13. The HBA of claim 12 wherein the control module includes one or more control bits to activate transport layer retry.

14. A method comprising:
   transmitting a write command from an initiator port to a target port;
   receiving a first signal at the initiator port indicating that the target port is ready to receive a first segment of write data;
   receiving an initially transmitted second signal at the initiator port indicating that the target port is ready to receive a second segment of write data; and
   receiving another second signal at the initiator port indicating that the target port is ready to receive the second segment of write data, the another second signal being a retransmitted copy of the initially transmitted second signal and also being a XFER RDY frame in accordance with a serial attached small computer system interface protocol.

15. The method of claim 14 further comprising transmitting the first segment of write data in response to receiving the first signal indicating that the target port is ready to receive the first segment of write data.

16. The method of claim 15 further comprising transmitting the second segment of write data in response to receiving the initially transmitted second signal indicating that the target port is ready to receive the second segment of write data.

17. The method of claim 16 further comprising retransmitting the second segment of write data upon performing the transport layer retry.

18. The method of claim 15 further comprising the target port detecting an error in the second segment of write data.

* * * * *

UNITED STATES PATENT AND TRADEMARK OFFICE
CERTIFICATE OF CORRECTION

| | | |
|---|---|---|
| PATENT NO. | : 7,516,257 B2 | Page 1 of 1 |
| APPLICATION NO. | : 11/237454 | |
| DATED | : April 7, 2009 | |
| INVENTOR(S) | : Victor Lau et al. | |

It is certified that error appears in the above-identified patent and that said Letters Patent is hereby corrected as shown below:

In column 6, line 20, in Claim 17, after "performing" delete "the" and insert -- a --, therefor.

Signed and Sealed this
Fourteenth Day of August, 2012

David J. Kappos
*Director of the United States Patent and Trademark Office*